(12) United States Patent
Zhou et al.

(10) Patent No.: US 7,686,986 B2
(45) Date of Patent: Mar. 30, 2010

(54) MAGNESIUM HYDROXIDE NANOPARTICLES, METHODS OF MAKING SAME AND COMPOSITIONS INCORPORATING SAME

(75) Inventors: Zhenhua Zhou, Lawrenceville, NJ (US); Zhihua Wu, Lawrenceville, NJ (US); Bing Zhou, Cranbury, NJ (US)

(73) Assignee: Headwaters Technology Innovation, LLC, Lawrenceville, NJ (US)

( * ) Notice: Subject to any disclaimer, the term of this patent is extended or adjusted under 35 U.S.C. 154(b) by 810 days.

(21) Appl. No.: 11/325,908

(22) Filed: Jan. 5, 2006

(65) Prior Publication Data

US 2007/0152201 A1    Jul. 5, 2007

(51) Int. Cl.
C09K 21/00 (2006.01)

(52) U.S. Cl. .................. 252/609; 524/436; 523/200; 523/513; 423/335; 423/635; 423/636; 208/138; 106/18.26

(58) Field of Classification Search ................ 252/609; 210/651; 523/200, 513; 423/636, 584, 335, 423/635, 638–639, 162, 163, 164; 502/125; 208/138; 524/436; 106/18.26
See application file for complete search history.

(56) References Cited

U.S. PATENT DOCUMENTS

| | | | |
|---|---|---|---|
| 3,366,451 A | 1/1968 | Waldron, Jr. et al. | 423/163 |
| 3,508,869 A | 4/1970 | Shoaff | 423/639 |
| 4,145,404 A | 3/1979 | Miyata | 423/635 |
| 4,314,985 A | 2/1982 | Bonney | 423/636 |
| 4,693,872 A | 9/1987 | Nakaya et al. | 423/164 |
| 4,695,445 A | 9/1987 | Nakaya et al. | 423/635 |
| 4,698,379 A | 10/1987 | Nakaya et al. | 523/513 |
| 5,143,965 A | 9/1992 | Mertz | 524/436 |
| 5,286,285 A | 2/1994 | Meier et al. | 106/18.26 |
| 5,476,642 A | 12/1995 | Skubla et al. | 423/162 |
| 5,760,115 A * | 6/1998 | Okisaki et al. | 524/261 |
| 5,872,169 A | 2/1999 | Elsner et al. | 524/436 |
| 6,214,313 B1 | 4/2001 | Berisko et al. | 423/638 |
| 6,569,399 B2 | 5/2003 | Brasch et al. | 423/636 |
| 6,676,920 B1 | 1/2004 | Oishi et al. | 423/635 |
| 6,746,597 B2 | 6/2004 | Zhou et al. | 208/138 |
| 6,761,866 B1 | 7/2004 | James et al. | 423/335 |
| 7,011,807 B2 | 3/2006 | Zhou et al. | 423/584 |
| 7,045,479 B2 | 5/2006 | Zhou et al. | 502/125 |
| 2002/0015677 A1 | 2/2002 | Brasch et al. | 423/636 |
| 2003/0204019 A1* | 10/2003 | Ding et al. | 525/191 |
| 2004/0127602 A1 | 7/2004 | Schaeling et al. | 523/200 |
| 2005/0127001 A1 | 6/2005 | Lindemann et al. | 210/651 |
| 2005/0186151 A1* | 8/2005 | Giroud | 424/59 |
| 2005/0235830 A1* | 10/2005 | Hughes | 96/108 |
| 2005/0255515 A1* | 11/2005 | Roitman et al. | 435/6 |
| 2005/0287348 A1* | 12/2005 | Faler et al. | 428/315.5 |

FOREIGN PATENT DOCUMENTS

| | | |
|---|---|---|
| GB | 2110656 | 6/1983 |
| JP | 58120514 | 7/1983 |
| JP | 63277511 | 11/1988 |
| JP | 03197316 | 8/1991 |

* cited by examiner

Primary Examiner—Ling-Siu Choi
Assistant Examiner—Bijan Ahvazi
(74) Attorney, Agent, or Firm—Workman Nydegger

(57) ABSTRACT

Magnesium hydroxide nanoparticles are made from a magnesium compound that is reacted with an organic dispersing agent (e.g., a hydroxy acid) to form an intermediate magnesium compound. Magnesium hydroxide nanoparticles are formed from hydrolysis of the intermediate compound. The bonding between the organic dispersing agent and the magnesium during hydrolysis influences the size of the magnesium hydroxide nanoparticles formed therefrom. The magnesium hydroxide nanoparticles can be treated with an aliphatic compound (e.g., a monofunctional alcohol) to prevent aggregation of the nanoparticles during drying and/or to make the nanoparticles hydrophobic such that they can be evenly dispersed in a polymeric material. The magnesium hydroxide nanoparticles exhibit superior fire retarding properties in polymeric materials compared to known magnesium hydroxide particles.

17 Claims, No Drawings

MAGNESIUM HYDROXIDE NANOPARTICLES, METHODS OF MAKING SAME AND COMPOSITIONS INCORPORATING SAME

BACKGROUND OF THE INVENTION

1. The Field of the Invention

The present invention relates generally to magnesium hydroxide nanoparticles, methods of making magnesium hydroxide nanoparticles, and compositions incorporating such nanoparticles. Magnesium hydroxide nanoparticles are made using an organic agent having at least two functional groups that influence the size, shape and/or dispersibility of the nanoparticles.

2. The Relevant Technology

Fires are a frequent and dangerous hazard throughout the world. Every year fires kill people and cause substantial economic loss. According to statistics, the monetary loss due to fire is equivalent to 0.2% to 0.3% of the GNP of European and North American countries. Despite extensive fire prevention measures and fire fighting efforts, there are thousands of fire-related deaths in all countries, including developed countries in Europe and North America.

Many materials can be made less hazardous in a fire by including a flame retardant. Flame retardants are often used as filler materials in plastics and other materials for their ability to inhibit combustion and smoke generation.

There are many classes of compounds that are useful as flame retardants. Inorganic minerals, organo-phosphates, and halogenated compounds are commonly used in plastics and other materials. Magnesium hydroxide is a known flame retardant that is attracting substantial attention because of its performance, price, low corrosiveness, and low toxicity. The current market for magnesium hydroxide in flame retardants is about ten million pounds per year.

Magnesium hydroxide ($Mg(OH)_2$) is an acid-free, halogen-free flame retardant suitable for use in plastics. Both hydroxide ions in magnesium hydroxide decompose endothermically when heated to temperatures greater than 340° C. The decomposition of $Mg(OH)_2$ has the following formula: $Mg(OH)_2 \rightarrow MgO + H_2O$ 1316 J/g.

The high decomposition temperature of magnesium hydroxide results in the absorption of larger amounts of heat energy than other known flame retardants. For example, aluminum trihydroxide (ATH) decomposes at 200° C. according to the following formula. $2Al(OH)_3 \rightarrow Al_2O_3 + 3H_2O$ 1051 J/g. As can be seen from the equations, the decomposition of magnesium hydroxide consumes 265 J/g more heat energy than ATH. In addition, the 100° C. higher decomposition temperature of magnesium hydroxide (compared to ATH) allows magnesium hydroxide to be processed in plastics at higher temperatures.

The decomposition products of manganese hydroxide (i.e., water and MgO) are non-toxic, and the mineral phase, MgO, is alkaline, which reduces the likelihood that acidic, corrosive gases will be formed and/or escape from the plastic when heated to combustion temperatures.

The gaseous water formed in the decomposition of the magnesium hydroxide is believed to envelop the flame, thereby excluding oxygen and diluting flammable gases. Similar to the function of char formed by phosphorous-containing flame retardants, a heat insulating material comprising MgO may form on the surface of the plastic in contact with the flame, reducing the flow of potentially flammable decomposition products to the gas phase where combustion occurs.

Magnesium hydroxide is typically incorporated into plastic as a finely divided powdery filler. To obtain the desired fire retarding properties, the magnesium hydroxide is added to plastics in relatively high amounts. In some cases, the weight of the magnesium hydroxide filler is equal to the weight of the plastic material. Including large amounts of a particulate filler, however, can have a negative effect on the tensile strength and other mechanical properties of the plastic material. Plastic materials having large quantities of magnesium hydroxide have also been known to absorb water, thereby decreasing tensile strength and increasing the rate of aging.

BRIEF SUMMARY OF THE INVENTION

The present invention is directed to the manufacture of novel magnesium hydroxide nanoparticles, novel methods of making magnesium hydroxide nanoparticles, and novel materials comprising the novel magnesium hydroxide nanoparticles. The magnesium hydroxide nanoparticles of the present invention are made using an organic dispersing agent. Nanoparticles made with an organic agent are smaller, perform better, and are more dispersible in polymers than other known magnesium hydroxide particles.

According to one embodiment, the inventive magnesium hydroxide nanoparticles are manufactured according to the following process: (i) providing a plurality of magnesium atoms (i.e., ions), (ii) providing a plurality of organic dispersing agent molecules comprising at least one functional group selected from the group consisting of a carboxyl, a carbonyl, an amine, an amide, a nitrogen having a free lone pair of electrons, a hemiacetal, a carboxy thiol, a thiol, a sulfonic acid, a sulfonyl halide, an acyl halide, and derivatives thereof; (iii) reacting the organic agent molecules with the magnesium atoms to form an intermediate magnesium compound; (iv) treating the intermediate magnesium compound with a base to form a plurality of magnesium hydroxide particles; and, optionally, (v) mixing the magnesium hydroxide particles of step (iv) with an aliphatic compound comprising a $C_1$ to $C_{30}$ hydrocarbon to render them more hydrophobic.

The magnesium hydroxide particles are formed by hydrolysis of the intermediate magnesium compound. During formation of the nanoparticles, the organic dispersing agent molecules influence the size and shape of the nanoparticles.

The dispersing agent comprises at least one organic compound that has at least one functional group selected from carboxyl groups, carbonyl groups, a nitrogen having a free lone pair of electrons, hemiacetal groups, amine groups, amide groups, nitrile groups, acyl halide groups, carboxy thiol groups, sulfonyl halide groups, and sulfonic acid groups. Preferably, the dispersing agent compound will have at least two functional groups, one of which is optionally a hydroxyl group.

Nanoparticles formed using the organic dispersing agents of the present invention are extremely small. In a preferred embodiment, the nanoparticles have an average primary particle size of less than 500 nm, more preferably less than 100 nm, and most preferably less than 50 nm. The small particle size gives the nanoparticles a larger surface area to volume ratio, which allows the particles to be more reactive and improves their fire retarding properties. Manufacturing the nanoparticles with the organic dispersing agent also creates nanoparticles with a narrow size distribution.

The magnesium hydroxide nanoparticles can also be treated with an aliphatic compound (e.g., a monofunctional alcohol) to render the surface of the particles more hydrophobic. This helps prevent agglomeration of the nanoparticles and makes them more dispersible within polymeric materials. Preferably the aliphatic compound is a $C_1$ to $C_{30}$ hydrocarbon with at least one hydroxyl group or carboxyl group.

In one embodiment, the surface of the magnesium hydroxide nanoparticles of the present invention have one or more organic surface-functionalizing molecules with the following formula: $-L_1-R_1-L_2$, wherein $L_1$ is a linking group and $L_2$ is a linking group or terminal group. $L_1$ and $L_2$ are independently selected from the group consisting of a hydroxyl, a carboxyl, a carbonyl, an amine, an amide, a nitrogen having a free lone pair of electrons, a hemiacetal, a carboxy thiol, a thiol, a sulfonic acid, a sulfonyl halide, an acyl halide, and derivatives thereof. $R_1$ is a direct bond or a branched or unbranched, cyclic or acyclic, substituted or unsubstituted, saturated or unsaturated, or aromatic hydrocarbon having between 1 and 30 carbon atoms.

The surface-functionalizing molecules are a derivative or in some cases identical to the organic dispersing agent. When the functional group on the dispersing agent molecule reacts with a magnesium atom, the functional group and the magnesium form $L_1$. Consequently, $L_1$ is typically a derivative of one of the functional groups of the organic dispersing agent (e.g., an ester formed from a carboxylic acid group).

$L_2$ can be a linking group or a terminal functional group depending on whether the magnesium hydroxide nanoparticles are surface treated. If the nanoparticles are not treated, $L_2$ can be a terminal functional group that provides a desired functionality for dispersing the nanoparticles in a polymer or resin.

If the nanoparticles are treated (e.g., with an aliphatic compound), $L_2$ can be a linking group formed from the reaction between the functional group on the surface-functionalizing molecules and the aliphatic compound. In this case, $L_2$ is typically a derivative of one of the functional groups of the organic dispersing agent molecule (e.g. an ester formed from a carboxylic acid group).

In an exemplary embodiment, nanoparticles treated with an aliphatic compound according to the present invention have a formula of $-L_1-R_1-L_2-R_2$, wherein $L_1, L_2$, and $R_1$ are as defined above and $R_2$ is a branched or unbranched, cyclic or acyclic, substituted or unsubstituted, saturated or unsaturated, or aromatic hydrocarbon having between 1 and 30 carbon atoms.

The components of the formula $-L_1-R_1-L_2-R_2$ can be illustrated by an example using a diacid such as oxalic acid and an aliphatic compound such as butanol. Nanoparticles manufactured using these reagents can have surface-functionalizing molecules with the following groups: $L_1$ is an ester, $R_1$ is a direct bond; $L_2$ is an ester; and $R_2$ is a $C_4$ hydrocarbon. The esters that form $L_1$ and $L_2$ are derivatives of the carboxylic acids of the oxalic acid molecule.

The magnesium hydroxide nanoparticles of the present invention have improved performance compared with commercially available magnesium hydroxide particles due to their small size and optional surface functionality. The organic agent allows the magnesium hydroxide to be formed as extremely small particles, while the aliphatic compound prevents the nanoparticles from agglomerating during drying. The aliphatic compound also improves the affinity of the nanoparticles to polymer molecules, allowing the nanoparticles to be more easily dispersed in plastics and other materials.

The improved fire retarding properties of the magnesium hydroxide nanoparticles of the present invention allow the nanoparticles to be included in polymers in smaller amounts, thereby reducing the undesirable effects that large quantities of filler can have on the polymer's chemical and physical properties.

These and other advantages and features of the present invention will become more fully apparent from the following description and appended claims as set forth hereinafter.

DETAILED DESCRIPTION OF EXEMPLARY EMBODIMENTS

I. Introduction and Definitions

The present invention is directed to the manufacture of novel magnesium hydroxide nanoparticles as well as novel methods of making magnesium hydroxide nanoparticles and materials incorporating the novel nanoparticles. Magnesium hydroxide nanoparticles are made from a magnesium compound that is reacted with an organic dispersing agent (e.g., a hydroxy acid) to form an intermediate magnesium compound. Magnesium hydroxide nanoparticles are formed from hydrolysis of the intermediate compound using a base. The bonding between the organic dispersing agent and the magnesium atoms during hydrolysis influences the size of the magnesium hydroxide nanoparticles formed therefrom. The magnesium hydroxide nanoparticles can be treated with an aliphatic compound (e.g., a monofunctional alcohol) to prevent aggregation of the nanoparticles during drying and/or to make the nanoparticles hydrophobic such that they can be evenly dispersed in a polymeric material.

For purposes of this invention, the term "nanoparticles" or "nano-sized particles," means particles with an average diameter of less than 1 micron (1000 nm).

II. Components Used to Manufacture Magnesium Hydroxide Nanoparticles

A. Magnesium Compounds

Any magnesium compound can be used with the present invention so long as it can be reacted with one or more of the organic agent molecules discussed below. Suitable magnesium compounds include magnesium metal and active magnesium salts, such as magnesium nitrate and magnesium chloride, magnesium sulfate and magnesium acetate.

The magnesium compound is preferably dissolved in a solvent prior to reacting it with the organic agent. The preferred solvent for dissolving the magnesium compound is water, with other suitable solvents including alcohols, carboxylic acids and the like.

B. Dispersing Agent

An organic dispersing agent is reacted with the magnesium compound to form an intermediate magnesium compound. The organic agent is selected to promote the formation of magnesium hydroxide nanoparticles that have a desired shape, size, and/or dispersibility. The organic agent preferably has two or more functional groups, at least one of which bonds with the magnesium compound prior to and/or during formation of the magnesium hydroxide nanoparticles. The organic agent can interact or complex with the magnesium through various mechanisms, including ionic bonding, covalent bonding, Van der Waals interaction/bonding, and/or hydrogen bonding.

Dispersing agents within the scope of the invention include a variety of organic molecules having one or more functional groups. Suitable functional groups for bonding the dispersing agent with the magnesium compound or providing additional functionality include one or more of a carboxyl, carbonyl, an amine, an amide, nitrile, a nitrogen with a free lone pair of electrons, a hemiacetal, a sulfonic acid, a sulfonyl halide, an acyl halide, and combinations of these. The dispersing agent may include secondary functional groups, like a hydroxyl group, so long as it also includes one or more primary functional groups from the foregoing list.

Examples of suitable organic agents include monofunctional compounds such as monofunctional carboxylic acids and carboxy thiols ((C=O)SH) and nitrogen containing compounds such as pyridine, diacids such as oxalic acid, malonic acid, maleic acid, and the like; and hydroxy acids such as glycolic acid, lactic acid, and the like. Useful polyfunctional dispersing agents include sugars (which can include a hemiacetal) such as glucose, polyfunctional carboxylic acids such as citric acid, hydroxy diacids, and the like.

Other useful organic agents include, urea, ethanolamine, mercaptoethanol, 2-mercaptoacetate, amino acids such as glycine or alanine (e.g., L-alanine or β-alanine), sulfonic acids such as sulfobenzyl alcohol and sulfobenzoic acid, and other sulfobenzyl compounds having amino and thiol functional groups.

C. Aliphatic Compounds

In a preferred embodiment, the magnesium hydroxide particles are treated with an aliphatic compound to render them more hydrophobic, and inhibit particle agglomeration, and improve their dispersibility in various polymers (e.g., polyethylene). The aliphatic compound is a hydrocarbon having between 1 and 30 carbon atoms and typically has at least one functional group selected from the group consisting of hydroxyl, carboxyl, thiol, and/or amine group. The aliphatic compound can be a fatty acid such as stearic acid or a salt thereof, and/or a coupling agent such as a silane, titanate, aluminate, and/or alum-titan coupler. In a preferred embodiment the aliphatic compound is a monofunctional alcohol such as butanol or a monofunctional carboxylic acid such as hexanoic acid.

D. Base

The intermediate magnesium compound is treated with a base to cause magnesium hydroxide particles to precipitate. Any base can be used to adjust the pH to cause precipitation. Suitable bases include ammonia, lime, sodium hydroxide, potassium hydroxide, and the like.

III. Methods of Making Magnesium Hydroxide Nanoparticles

The methods of making magnesium hydroxide nanoparticles according to the present invention generally include the following steps: (i) reacting a magnesium compound with an organic agent to form an intermediate magnesium compound; and (ii) applying a base to the reaction mixture to cause precipitation of a plurality of magnesium hydroxide nanoparticles. In one embodiment, the method also include (iii) treating the magnesium hydroxide nanoparticles with an aliphatic compound; and (iv) drying the magnesium hydroxide nanoparticles to form a powder.

The reaction between the magnesium compound and the organic agent is carried out by dissolving the magnesium compound either in water or another appropriate solvent. The organic agent is then mixed with the dissolved magnesium compound in a molar ratio of magnesium to dispersion agent of less than 100, preferably less than 30. One or more functional groups of the organic agent react with the magnesium ion, thereby forming the intermediate magnesium compound. The organic agent molecules can bond with the magnesium atoms (e.g., ions) through various suitable mechanisms, including ionic bonding, covalent bonding, Van der Waals interaction/bonding, lone pair electron bonding, and/or hydrogen bonding.

The intermediate magnesium compound is treated with a base to cause formation of magnesium hydroxide, which precipitates as nanoparticles. During formation of the nanoparticles, the organic agent controls (i.e., affects) the interaction between the magnesium atoms and the size and/or shape of the magnesium nanoparticles.

Magnesium hydroxide nanoparticles manufactured according to the present invention have at least a portion of magnesium hydroxide molecules that are bonded to one or more organic agent molecules. These remaining organic agent molecules can beneficially affect the surface properties of the magnesium hydroxide nanoparticles and/or can serve as a reactive site for bonding with an aliphatic compound as discussed below.

The magnesium hydroxide nanoparticles can be modified using an aliphatic compound having one or more functional groups (e.g., a monofunctional alcohol). Typically, the aliphatic compound is reacted with the magnesium hydroxide nanoparticles by mixing the two and heating the mixture (e.g., at 105° C.). The one or more functional groups of the aliphatic compound react with the organic agent molecules and/or hydroxide molecules on the nanoparticles to form surface treated magnesium hydroxide nanoparticles. Preferably, treatment with the aliphatic compound is performed after hydrolysis of the intermediate magnesium compound, although it is not required.

In a preferred embodiment, the aliphatic compound reacts with most or essentially all of the organic agent molecules exposed on the surface of the nanoparticles to cap off any available reactive functional groups on the organic agent molecules. While the organic agent functional groups can be advantageous for forming the nanoparticles, it is often desirable to remove or tie up these groups with hydrocarbons or other molecules that improve the dispersion of the particles in a polymer. If the polymeric material is not miscible with the functional groups of the organic agent, the organic material can be modified with an aliphatic compound having between 1 and 30 carbon atoms. The aliphatic compounds can significantly improve dispersibility of the nanoparticles in a polymer and prevent the nanoparticles from agglomerating to form larger particles. In some cases, nanoparticles treated with the aliphatic compound are loosely agglomerated, but are held sufficiently dispersed that decomposition rates in a fire are higher than solid particles of the same size. It is believed that the functionalizing agent molecules on the surface of the nanoparticles inhibit crystallizing between particles thereby maintaining smaller particle sizes.

Maintaining small and/or dispersed particles significantly enhances the flame retarding capabilities of the nanoparticles. Smaller particles can absorb energy more quickly because of the increased surface area to volume ratio. Thus, smaller particles can absorb energy and release water more quickly than larger particles, resulting in greater fire retarding capabilities. Due to the greater fire retarding capabilities of the nanoparticles of the present invention, the nanoparticles can be mixed with polymers in smaller quantities, thus improving the tensile strength or other mechanical properties of the polymer and reducing its cost while achieving the same fire retarding properties as polymers filled with larger amounts of other known magnesium hydroxide particles.

In an optional final manufacturing step, the nanoparticles are typically filtered at room temperature and dried at a temperature higher than about 50° C., more preferably higher than about 80° C. The drying step can be performed at ambient pressure or using a vacuum and/or heat. The dried nanoparticles typically form a very fine powder.

The use of an organic agent and an aliphatic compound in two separate steps can be advantageous for forming the magnesium hydroxide nanoparticles of the present invention. Because the reaction of the organic agent and the aliphatic agent are in separate reactions, each reaction can be optimized for desired results. For example, the reaction with the organic agent can be optimized to obtain a desired particle size (e.g., less than 100 nm), while the reaction with the aliphatic compound can be optimized for dispersing the nanoparticles in a polymer.

IV. Magnesium Hydroxide Nanoparticles and Polymeric Materials Incorporating the Nanoparticles The novel magnesium hydroxide nanoparticles of the present invention comprise particles of magnesium hydroxide having an average diameter of less than about 1000 nm and having one or more organic surface functionalizing molecules bonded thereto. The functionalizing molecules have the formula $-L_1-R_1-L_2$, wherein $L_1$ is a linking group and $L_2$ is a linking group or terminal group. $L_1$ and $L_2$ are independently selected from the group consisting of a hydroxyl, a carboxyl, a carbonyl, an amine, an amide, a nitrogen having a free lone pair of electrons, a hemiacetal, a carboxy thiol, a thiol, a sulfonic acid, a sulfonyl halide, an acyl halide, and derivatives thereof. $R_1$ is a direct bond or a branched or unbranched, cyclic or acyclic, substituted or unsubstituted, saturated or unsaturated, or an aromatic hydrocarbon having between 1 and 30 carbon atoms.

The surface-functionalizing molecules can be identical to the organic dispersing agent or can be a derivative thereof. The surface-functionalizing molecules are formed from the dispersing agent molecules. Whether the surface-functionalizing molecules are identical to or a derivative of the organic dispersing agent molecules typically depends on the type of bonding between the surface-functionalizing molecule and the surface. For example, where the surface-functionalizing molecules have a functional group that is an electron donor or hydrogen bonds with surface of the nanoparticle, the surface functionalizing molecules are typically substantially identical to the organic dispersing agent. In this case $L_1$ is one of a hydroxyl, a carboxyl, a carbonyl, an amine, an amide, a nitrogen having a free lone pair of electrons, a hemiacetal, a carboxy thiol, a thiol, a sulfonic acid, a sulfonyl halide, and/or an acyl halide.

Alternatively, $L_1$ can be a derivative of the foregoing functional groups. For example, where the functional group is a carboxylic acid, its derivative can be an ester. Other derivatives include thiol esters from carboxy thiol groups, acetals from hemiacetals, ethers from hydroxy groups, thiol ethers from thiols, and the like.

$L_2$ can be a linking group or a terminal functional group depending on whether the magnesium hydroxide nanoparticles are surface treated. If the nanoparticles are not treated, $L_2$ is typically a terminal functional group that provides a desired functionality for dispersing the nanoparticles in a polymer or resin.

If the nanoparticles are treated (e.g., with an aliphatic compound), $L_2$ can be a linking group formed from the reaction between a functional group on the surface-functionalizing molecule and the aliphatic compound. In this case, $L_2$ is typically a derivative of one of the functional groups of the organic dispersing agent molecule (e.g., an ester formed from a carboxylic acid group).

In an exemplary embodiment, nanoparticles treated with an aliphatic compound according to the present invention have a formula of $-L_1-R_1-L_2-R_2$, wherein $L_1$, $L_2$, and $R_1$ are as defined above and $R_2$ is a branched or unbranched, cyclic or acyclic, substituted or unsubstituted, saturated or unsaturated, or aromatic hydrocarbon having between 1 and 30 carbon atoms.

$R_1$ is also a component of the organic dispersing agent. $R_1$ typically includes the hydrocarbons and functional groups that separate two or more functional groups on a dispersing agent molecule. $R_1$ can include heteroatoms and/or functional groups that branch off from carbons. Polyfunctional organic dispersing agents often produce nanoparticles with surface-functionalizing molecules that have functional groups in addition to $L_1$ and $L_2$. For example, citric acid bonded to the surface of the nanoparticles and treated with butanol can have the following formula:

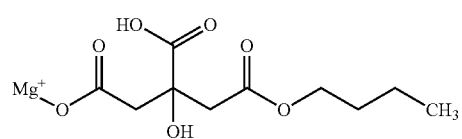

Formula 1

In Formula 1, $L_1$ is the ester linkage formed between the citric acid derivative and the magnesium atom (which is a magnesium atom on the surface of a magnesium hydroxide nanoparticle). $L_2$ is the ester linkage formed between the citric acid derivative and the butane group. The butane group forms $R_2$. $R_1$ is the three carbon chain between $L_1$ and $L_2$. $R_1$ also includes the free carboxylic acid and hydroxyl groups on the carbon between $L_1$ and $L_2$ (i.e., the central carbon atom of the citric acid derivative).

It is also possible for $R_1$ to have additional linkages to the surface of the magnesium hydroxide particle. For example, in Formula 1, the hydroxyl or carboxyl group of $R_1$ can be bonded to the surface of the magnesium hydroxide particle. In an alternative embodiment, a plurality of surface-functionalizing molecules can be linked together in a polymer through $R_1$ (e.g., polyacrylates or polybenzimidizoles).

The magnesium hydroxide nanoparticles of the present invention have improved performance compared with commercially available magnesium hydroxide particles due to their small size and surface functionality. In a preferred embodiment, the nanoparticles have an average particle size less than 500 nm, more preferably less than 100 nm, and most preferably less than 50 nm. The small particle size gives the nanoparticles a larger surface area to volume ratio, which allows the particles to be more reactive and improves the fire extinguishing properties.

The surface functionalizing molecules are believed to provide at least two benefits. Firstly, the functionalizing molecules can be selected to improve dispersion in a polymer. The aliphatic portion of the functionalizing molecules assists in dispersing the magnesium hydroxide particles in hydrophobic polymers, such as methyl methacrylate, polyethylene, polypropylene and other polyolefins. Good dispersion using the nanoparticles of the present invention is particularly advantageous because of the improved performance of the nanoparticles of the present invention as compared to commercially available magnesium hydroxide particles. Because the nanoparticles of the present invention have higher performance, a smaller amount of these particles can be used in polymeric materials. The smaller amount of polymeric materials increases the need to have the particles well dispersed, such that fire retarding properties are uniform throughout the plastic part.

Secondly, the functionalizing molecules help prevent the magnesium hydroxide nanoparticles from agglomerating to form larger magnesium hydroxide nanoparticles. Even where some agglomeration occurs, this bonding is typically via a Van der Waals interaction between the functionalizing molecules, which is more easily disrupted by heat. Alternatively, if the agglomeration is caused by bonding between magnesium hydroxide molecules, the magnesium hydroxide molecules cannot form a good crystal between several magnesium hydroxide molecules because the surface functionalizing molecules disrupt such an arrangement.

The magnesium hydroxide nanoparticles of the present invention can be incorporated into any polymerizable or polymeric material. Those skilled in the art are familiar with the types of polymers suitable for incorporating magnesium hydroxide and include, but are not limited to, those described in U.S. Pat. Nos. 4,098,762 and 4,145,404. The nanoparticles of the present invention are particularly useful for incorporation into thermoplastic polymers for injection molding and other melt-shaping processes due to its high decomposition temperature. If desired, the nanoparticles can be incorporated into the polymer without being treated by the aliphatic compound if the chemical properties of the polymer favor a more polar nanoparticle surface.

The amount of magnesium hydroxide added to the thermoplastic material depends on the amount of fire retarding capabilities that are desired for the polymeric material. Because of the fine particle size and surface functionality the magnesium hydroxide nanoparticles of the present invention can be included in polymers in lower amounts while obtaining the same level of fire retarding properties as commercially available magnesium hydroxide nanoparticles. Those skilled in the art are familiar with adjusting the amount of magnesium hydroxide to obtain a desired level of fire retarding capabilities. Typically, the amount of magnesium hydroxide particles needed to achieve good fire retarding properties is less than the amount needed using other known magnesium hydroxide particles, since the nanoparticles of the present invention have higher performance. Typically, suitable fire retarding properties can be achieved using between 20% and 30% of the $Mg(OH)_2$ nanoparticles of the present invention.

Various conventional additives can also be included in the polymeric materials of the present invention. Such additives include pigments, antioxidants, U.V. absorbers, plasticizers and lubricants, etc. Examples of such conventional additives and customary amounts are described in U.S. Pat. Nos. 4,098, 762 and 4,195,404.

V. Examples

The following examples describe formulas that can be used to manufacture magnesium hydroxide nanoparticles according to the present invention.

Example 1

Example 1 describes a method for making magnesium hydroxide particles using glycolic acid. 28.23 g of a 70 wt % glycolic acid solution was diluted in 0.5 liter of water. The diluted glycolic acid and 600 g of $Mg(NO_3)_2 \cdot 6H_2O$ were added to 2 liters of water to form Solution A. 268 g of 29.7 wt % ammonium was diluted in 2.5 liters of water. Solution A was added to this ammonium solution dropwise while stirring. The reaction yielded a precipitate. The precipitate was filtered and then washed twice with 1 liter of water per washing. The resulting slurry-precipitate was treated with 400 ml of 1-butanol and heated to 105° C. and then filtered and dried under vacuum at 130° C. for 6 hours.

Example 2

Example 2 describes a method for making magnesium hydroxide particles using citric acid. 17.5 g of citric acid was dissolved into 0.5 liter of water. The citric acid solution and 500 g of $MgCl_2 \cdot 6H_2O$ were dissolved in 2 liters of water to form Solution A. 182.3 g of $Ca(OH)_2$ dissolved in 1 liter of $H_2O$ was added dropwise to Solution A while stirring. The reaction yielded a precipitate, which was filtered and washed twice with 1 liter of water per washing. The resulting slurry-precipitate was treated with 400 ml of 1-butanol and heated to 105° C. and then filtered and dried under vacuum at 130° C. for 6 hours.

Example 3

Example 3 describes a method for making magnesium hydroxide particles using citric acid. 16.65 g of citric acid was dissolved in 0.5 liter of water. The citric acid solution and 600 g of $Mg(NO_3)_2 \cdot 6H_2O$ were dissolved in 2 liters of water to form Solution A. 93.6 g of NaOH was dissolved in 1 liter of water and then added to Solution A dropwise while stirring. The reaction yielded a precipitate, which was filtered and washed twice with 1 liter of water per washing. The resulting slurry-precipitation was treated by adding 13.6 g of 2-ethyl hexanoic acid at 100° C. and further treated with 400 ml of 1-butanol and then heated to 105° C., then filtered and dried under vacuum at 130° C. for 6 hours.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. Fire retardant magnesium hydroxide particles, comprising:
a plurality of magnesium hydroxide particles having an average diameter of less than 1000 nm, each magnesium hydroxide particle having one or more surface functionalizing molecules bonded thereto in a molar ratio of magnesium to functionalizing molecules of less than 100, the functionalizing molecules having the following formula:

$$-L_1-R_1-L_2-R_2$$

wherein
$L_1$ and $L_2$ are linking groups independently selected from the group consisting of a hydroxyl, a carboxyl, a carbonyl, an amine, an amide, a nitrogen having a free lone pair of electrons, a hemiacetal, a carboxy thiol, a thiol, a sulfonic acid, a sulfonyl halide, an acyl halide, and derivatives thereof; and
$R_1$ and $R_2$ are independently a branched or unbranched, cyclic or acyclic, substituted or unsubstituted, saturated or unsaturated, or aromatic hydrocarbon having between 1 and 30 carbon atoms.

2. The magnesium hydroxide particles of claim 1, wherein the magnesium hydroxide particles are substantially free of water such that the particles form a dry powder.

3. A fire retardant composition, comprising the magnesium hydroxide particles of claim 2 mixed with a polymerizable resin.

4. The magnesium hydroxide particles of claim 1, wherein $L_2$-$R_2$ is a fatty acid, a silane, a titanate, an aluminate, an alum-titan, a monofunctional alcohol, a monofunctional carboxylic acid, or a derivative thereof.

5. A fire retardant composition, comprising the magnesium hydroxide particles of claim 2 mixed with a polymeric material.

6. The fire retardant composition as in claim 5, wherein the polymeric material comprises at least one of a polyolefin or methyl methacrylate.

7. A method of manufacturing the fire retardant magnesium hydroxide particles of claim 1, the method comprising:
   (i) providing a plurality of magnesium atoms;
   (ii) providing a plurality of organic agent molecules comprising at least one functional group selected from the group consisting of a carboxyl, a carbonyl, an amine, an amide, a nitrogen having a free lone pair of electrons, a hemiacetal, a carboxy thiol, a thiol, a sulfonic acid, a sulfonyl halide, an acyl halide, and derivatives thereof;
   (iii) reacting the organic agent molecules with the magnesium atoms to form an intermediate magnesium compound; and
   (iv) treating the intermediate magnesium compound with a base to form magnesium hydroxide particles.

8. A method as in claim 7, further comprising drying the magnesium hydroxide particles formed in step (iv) by mixing the particles with an organic solvent and evaporating the solvent.

9. A method as in claim 7, wherein the organic agent molecules comprise an aliphatic compound which is a monofunctional alcohol or an organic acid.

10. A method as in claim 7, wherein the solvent comprises butanol.

11. A method as in claim 7, wherein the organic agent comprises two or more different types of functional groups.

12. A method as in claim 11, wherein at least one of the two or more different types of functional groups is a hydroxyl group.

13. A method as in claim 7, wherein the organic agent molecules comprise one or more of glycolic acid, citric acid, glycine, alanine, ethanolamine, urea, mercaptoethanol, mercaptoacetate, sulfobenzyl alcohol, sulfobenzoic acid, or pyridine.

14. A method as in claim 7, wherein the magnesium hydroxide particles have an average diameter of less than about 500 nm.

15. A method as in claim 7, wherein the magnesium hydroxide particles have an average diameter of less than about 50 nm and agglomerate to form agglomerated particles of between about 100 nm and about 1000 nm.

16. A plurality of magnesium hydroxide nanoparticles manufactured according to the method of claim 7.

17. A composition comprising a polymeric material mixed with the nanoparticles of claim 16.

* * * * *

UNITED STATES PATENT AND TRADEMARK OFFICE
CERTIFICATE OF CORRECTION

PATENT NO. : 7,686,986 B2  Page 1 of 1
APPLICATION NO. : 11/325908
DATED : March 30, 2010
INVENTOR(S) : Zhou et al.

It is certified that error appears in the above-identified patent and that said Letters Patent is hereby corrected as shown below:

Column 1
Line 54, change "manganese hydroxide" to --magnesium hydroxide--

Column 5
Line 54, change "include" to --includes--

Column 6
Line 46, change "dispersed that" to --dispersed so that--

Column 9
Line 50, change "4,195,404" to --4,145,404--

Signed and Sealed this

Tenth Day of August, 2010

David J. Kappos
*Director of the United States Patent and Trademark Office*